United States Patent [19]

Mandy

[11] Patent Number: 4,690,759
[45] Date of Patent: Sep. 1, 1987

[54] CENTRIFUGAL AND IMPINGEMENT OIL SEPARATOR

[75] Inventor: Zoltan A. Mandy, Waynesboro, Pa.

[73] Assignee: Frick Company, Waynesboro, Pa.

[21] Appl. No.: 918,062

[22] Filed: Oct. 14, 1986

[51] Int. Cl.⁴ ............................................. B01D 19/00
[52] U.S. Cl. ..................................... 210/304; 55/184;
55/204; 55/471; 55/473; 210/541; 210/542
[58] Field of Search ................. 55/328, 337, 203, 405,
55/204, 36, 90, 91, 471, 159, 184, 473, 199, 201,
235, 237, 349, 447, 459 R, 459 C; 210/294, 295,
299, 304, 541, 542

[56] References Cited

U.S. PATENT DOCUMENTS

| 441,995 | 12/1890 | Wheeler . | |
|---|---|---|---|
| 1,034,204 | 7/1912 | Cobb | 55/405 |
| 1,982,733 | 12/1934 | Forster . | |
| 2,692,027 | 10/1954 | Ammons . | |
| 3,304,697 | 2/1967 | Ramsey . | |
| 3,499,270 | 3/1970 | Paugh . | |
| 3,520,149 | 7/1970 | Uratani . | |
| 3,633,377 | 1/1972 | Quick . | |
| 3,778,984 | 12/1973 | Lawser . | |
| 4,113,450 | 9/1978 | Goransson et al. . | |
| 4,305,825 | 12/1981 | Laval, Jr. . | |
| 4,506,523 | 3/1985 | DiCarlo et al. . | |

Primary Examiner—Frank Sever
Attorney, Agent, or Firm—Dowell & Dowell

[57] ABSTRACT

An oil separator, for use in the compressor discharge of a refrigeration system, has a turbine wheel on which refrigerant vapor impacts positioned within a vessel so that the oil is slung outwardly and impinges on the side walls of the vessel and the oil-free vapor is deflected 180° to flow upwardly through the turbine wheel for discharge from the vessel.

9 Claims, 4 Drawing Figures

CENTRIFUGAL AND IMPINGEMENT OIL SEPARATOR

BACKGROUND OF THE INVENTION

1. Field of the Invention

The invention relates generally to the art of refrigeration. In refrigeration compressors, particularly of the helical screw type, oil is required to seal, cool, lubricate and to actuate moving parts. Resultantly, oil becomes mixed with the high pressure refrigerant and must be removed continuously. Oil separators are generally positioned in such systems at the discharge of the compressor and ahead of the condenser.

2. Description of the Prior Art

As indicated above, the need for oil separators has been present for many years and various types have been employed.

Examples of separators in prior United States patents are noted as follows.

The Wheeler U.S. Pat. No. 441,995, discloses an oil separator having a tangential inlet flow along a spiral passageway so that the oil tends to flow downwardly along the outer sides of the passageway, and the vapor is withdrawn upwardly through the central portion of the passageway.

The Forster U.S. Pat. No. 1,982,733 discloses an air and dust separator in which the air-dust mixture tangentially enters the elongated casing at the top, through an expanded inlet pipe, thereby reducing its inlet velocity. It enters above the level of the rotary vanes and thus must turn downwardly before engaging the vanes, the air thereafter turning upwardly to escape through the sleeve. The lower portion of the casing tapers to reduced diameter for maintaining the whirling of the dust and its descent to the outlet.

The Ammons U.S. Pat. No. 2,692,027 discloses a tangential inlet with a cylindrical screen at the lower portion of the housing through which the vapor passes prior to being drawn upwardly through an outlet.

The Ramsey U.S. Pat. No. 3,304,697 discloses a tangential inlet into a vessel with an inner chamber, the vapor being drawn upwardly through a central outlet.

The Paugh U.S. Pat. No. 3,499,270 discloses a tangential inlet with a tapered inlet tube into a conical chamber so that the oil is deposited around the sides of the chamber and the vapor is deflected upwardly from a central plate through an outlet stack into a filter assembly forming a secondary separator.

The Uratani U.S. Pat. No. 3,520,149 discloses a tangential inlet around a centrally located housing which holds a filter material through which the gas flows upwardly.

The patent to Quick discloses a tangential inlet for a separator in which the gas flows upwardly through a cylindrical filter at the upper portion and then is discharged downwardly through an outlet pipe.

The Lawser U.S. Pat. No. 3,778,984 discloses a tangential inlet and the gas discharging through a cylindrical screen to an outlet in the upper central portion of the vessel.

The Goransson et al. U.S. Pat. No. 4,113,450 discloses a tangential inlet and a cylindrical filter in the upper portion of the vessel through which the vapor passes.

The Laval U.S. Pat. No. 4,305,825 discloses a tangential inlet into a vessel having an impingement disk in the lower portion against which the vapor carrying oil impinges, the oil then draining downwardly from the disk and the vapor being deflected upwardly through a central outlet member.

The DiCarlo et al. U.S. Pat. No. 4,506,523 discloses a tangential inlet into a vessel having screen along the sides and an upper central outlet.

SUMMARY OF THE INVENTION

An oil separator preferably has a reduced cross-section nozzle inlet which discharges into an elongated upright cylindrical vessel against rotary turbine vanes which sling the oil that collects on the blades outwardly at high velocity against the sides of the vessel so that it descends to the bottom for discharge. The vapor then flows downwardly thereby driving the oil in the same direction. The substantially oil-free vapor then engages a flow reverter plate and is deflected 180° upwardly through an open central area in the turbine wheel and into the upper portion of the vessel within the interior of a coalescent filtering element that removes any remaining oil mist from which it flows through a discharge outlet.

DESCRIPTION OF THE PREFERRED EMBODIMENT

Figure 1:
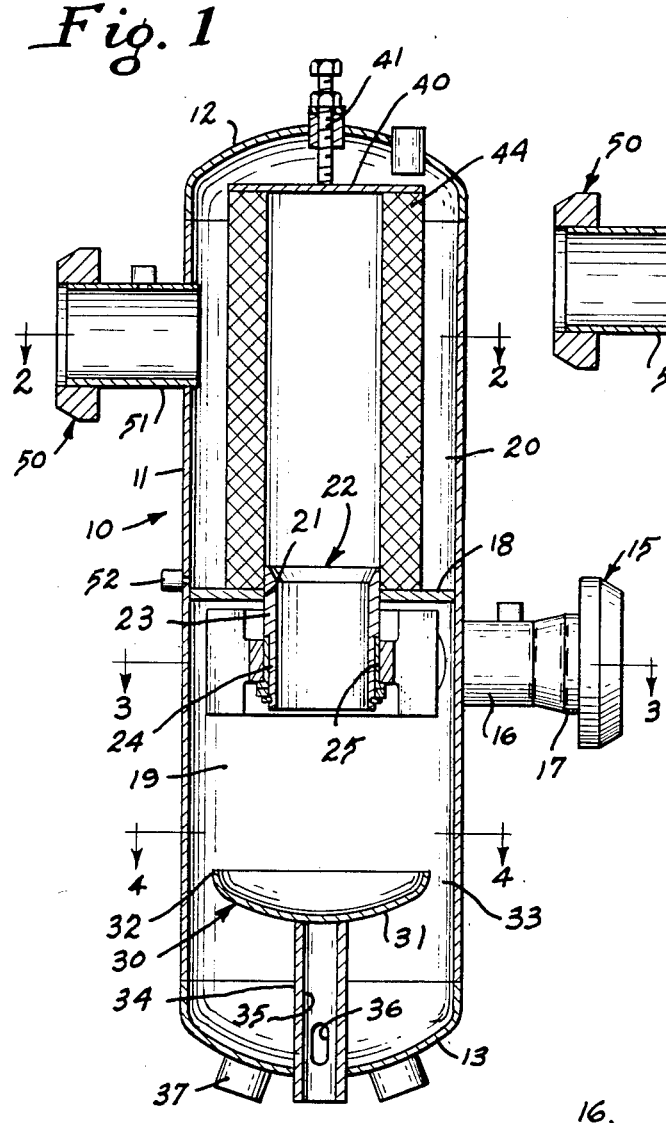
FIG. 1 is a vertical section through a separator in accordance with the present invention.
Figure 2:
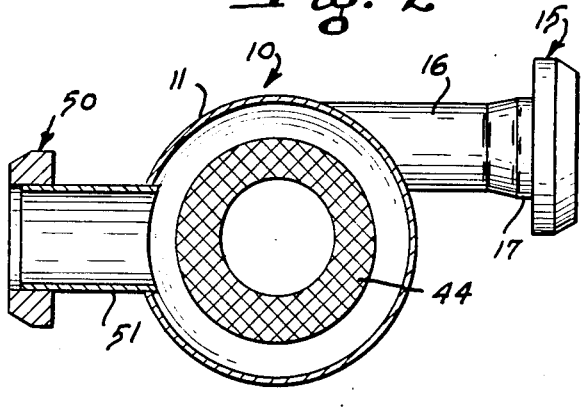
FIGS. 2, 3 and 4 are sections on the lines 2—2, 3—3, 4—4, respectively, of FIG. 1.
Figure 4:
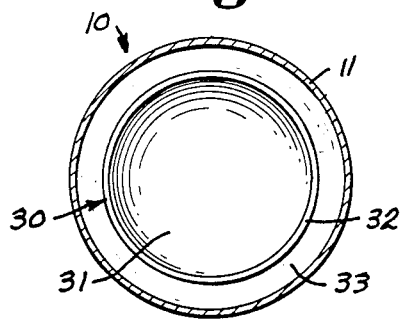
Figure 3:
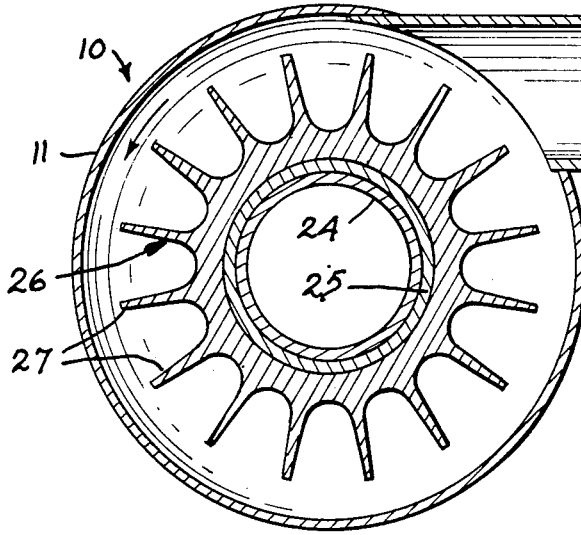

The separator of the present invention includes a generally cylindrical elongated vessel 10 having a side wall 11 and upper and lower end walls 12 and 13. The vessel is ordinarily mounted about a vertical axis, as indicated. The vessel has an inlet nozzle assembly 15 which ordinarily receives the vapor-oil stream from the discharge line of a compressor. The inlet pipe itself, 16, which is contiguous to the vessel 10, is preferably of a reduced diameter from the pipe 17 which communicates with the compressor discharge, in order to increase the velocity of the vaporoil stream as it enters the vessel.

Approximately midway between the upper and lower ends of the vessel, a mounting plate 18 is fixed within the vessel. The plate forms a gas and oil tight partition with the side wall of the vessel. The space 19 beneath the plate 18 forms a receiving chamber; the space 20 above provides a discharge chamber for the vapor. The mounting plate has a central opening 21 which receives a sleeve or nipple 22 with a downwardly depending portion 23 having a section of reduced diameter 24 which receives and seats the bearing 25 of a rotary turbine wheel 26 having vanes 27 around its periphery. The sleeve 22 has an internal opening 28. The turbine wheel is so positioned that the vanes directly receive the impact from the inward flow from the nozzle assembly 15.

Positioned centrally and in spaced relation beneath the turbine wheel is a flow reverter 30 having a bowl portion 31 that is concave upwardly within the vessel. The flow reverter 30 has an outer rim 32 that is spaced inwardly from the inner wall of the vessel in order to provide a space 33 therebetween for the passage of oil downwardly along the sides of the vessel. The bowl portion is rigidly mounted on an upright support 34 in the lower end of the vessel. The support 34 is hollow and has a bore 35 and a discharge opening 36 for the oil that gravitates to the bottom of the vessel.

The bottom wall 13 is also provided with connections 37 for magnetic plugs for the purpose of attracting and anchoring any metallic particles that may have been carried by the oil and permitting their removal from the vessel.

In the upper portion 20 of the vessel, an end plate 40 is engaged by a stem 41 of a fastening element and is engaged with a cylindrical coalescing filter element 44 which extends between the plate 40 and the mounting plate 18, the filter element 44 surrounding the upward extension of the opening in the turbine.

A discharge nozzle assembly 50 having a tube 51 is mounted in the side wall of the vessel at its upper portion and intermediate the ends of the coalescing filter 44 and is ordinarily connected to the line to the condenser.

In the operation of the device, the entering vapor oil stream, flowing at an increased rate of speed, impinges against the vanes 27 of the turbine wheel, driving the wheel at high speed, the oil initially tending to adhere to the vanes. The resultant centrifugal force slings the oil outwardly against the side wall of the vessel from which it drains downwardly. The vapor stream initially flows downwardly beneath the support plate 18 before reversing direction to escape through sleeve opening 28. In so doing, the vapor tends to drive the oil downwardly along the sides of the wall. The 180° reversal of flow direction of the vapor is assisted by its impact against the bowl 31 of the flow reverter 30. The substantially oil-free vapor flows upwardly through the central opening 28 of the sleeve 22 into the space within the coalescing filter 44, some of the vapor impinging against the upper plate 40 and the vapor being discharged through the outlet assembly 50.

In view of the relatively close proximity of the outer ends of the vanes 27 to the side wall of the vessel, the tendency of the vapor to have a rolling effect around the inner surface of the wall is reduced and the effect of the centrifugal force is increased so that efficient separation of the oil from the vapor is achieved. Thus, little or no oil remains with the vapor that impinges on the bowl 31 and therefore, little or no oil is collected in the bowl, the bowl merely serving to assist in reversing the direction of low of the vapor. In the event that any oil collects above the mounting plate 18 in the filter 44, it may be removed through the drain 52 in the side wall of the vessel directly above the plate 20.

I claim:

1. An oil separator comprising: means for use with an oil separation and return system for the compressor means of a refrigeration system including a vessel for receiving the relatively high pressure vapor-oil discharged from a compressor, said vessel having a receiving chamber with a cylindrical wall and a tangential inlet for connection to the compressor discharge conduit, oil outlet means at the lower end of said vessel, a turbine wheel rotatably mounted in said receiving chamber and positioned in line with said tangential inlet for receiving the impact of refrigerant vapor thereon, said turbine wheel having vanes on its exterior portion and a central portion that is open for the passage of vapor, a flow reverter mounted in spaced relation beneath said turbine wheel, said flow reverter comprising plate means extending laterally of said vessel and spaced from the wall thereof for enabling oil to freely flow downwardly of said wall but vapor flow is deflected upwardly towards the central portion of said turbine wheel, said vessel having a vapor discharge chamber above said receiving chamber and sealed therefrom except for the central portion of said turbine wheel, said discharge chamber having a vapor outlet, said flow reverter being positioned for causing substantially oil-free vapor to be deflected upwardly through the central portion of said turbine wheel for passage through said outlet directly to a filter means, and said turbine wheel being driven by the relatively high pressure refrigerant vapor-oil at a rapid rate, the oil in said vapor impinging thereon and being thrown outwardly into contact with the side walls of the vessel and draining downwardly to the oil outlet means sufficient that the oil is separated from the vapor and the vapor flows through the vessel to the vapor outlet.

2. The invention of claim 1, in which the vessel is elongated and generally cylindrical and with its axis generally vertical, and the tangential inlet is intermediate its upper and lower ends.

3. The invention of claim 1, and filter means mounted above said turbine wheel and extending substantially coaxially therewith above the level of said vapor outlet, whereby vapor deflected upwardly through the central portion of said turbine wheel passes laterally through said filter means and then through said outlet.

4. The invention of claim 1, in which the tangential inlet is of reduced cross-section.

5. The invention of claim 1, in which the flow reverter is a bowl that is concave upwardly.

6. The invention of claim 1, and magnetic means positioned at the bottom of said vessel for the purpose of attracting and holding any metallic particles in the oil.

7. The invention of claim 1, in which the mounting means includes a plate attached to the side walls of the vessel and carries a sleeve on which the turbine is journaled and which provides the open central portion of the turbine wheel, the mounting means providing a gas and oil tight partition in the vessel except for said open central portion.

8. The invention of claim 1, in which said filter means has substantially cylindrical wall means surrounding the exterior of said open central portion of said turbine wheel and spaced from said side walls.

9. The invention of claim 1, and vapor deflection means at the upper end of said filter means.

* * * * *